United States Patent
Takeichi

(10) Patent No.: US 12,445,700 B2
(45) Date of Patent: Oct. 14, 2025

(54) ELECTRONIC DEVICE, CONTROL METHOD OF AN ELECTRONIC DEVICE, AND NON-TRANSITORY COMPUTER READABLE MEDIUM

(71) Applicant: CANON KABUSHIKI KAISHA, Tokyo (JP)

(72) Inventor: Shinya Takeichi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 18/633,761

(22) Filed: Apr. 12, 2024

(65) Prior Publication Data
US 2024/0348899 A1 Oct. 17, 2024

(30) Foreign Application Priority Data
Apr. 17, 2023 (JP) .................. 2023-067294

(51) Int. Cl.
*H04N 23/45* (2023.01)
*H04N 23/63* (2023.01)

(52) U.S. Cl.
CPC ........... *H04N 23/45* (2023.01); *H04N 23/633* (2023.01)

(58) Field of Classification Search
CPC .... H04N 23/45; H04N 23/633; H04N 23/634; H04N 23/64; H04N 23/698; H04N 23/60; H04N 1/3876; H04N 23/951
See application file for complete search history.

(56) References Cited

U.S. PATENT DOCUMENTS

| | | | |
|---|---|---|---|
| 2016/0066778 A1* | 3/2016 | Imamura | A61B 3/0025 351/246 |
| 2018/0115694 A1* | 4/2018 | Choi | H04N 23/70 |
| 2022/0401039 A1* | 12/2022 | Soluch | A61B 5/486 |

FOREIGN PATENT DOCUMENTS

| | | | | |
|---|---|---|---|---|
| JP | 2015144347 A | * | 8/2015 | |
| JP | 2021-005829 A | | 1/2021 | |
| WO | WO-2014042104 A1 | * | 3/2014 | H04N 25/60 |

* cited by examiner

*Primary Examiner* — Shadan E Haghani
(74) *Attorney, Agent, or Firm* — Carter, DeLuca & Farrell LLP

(57) ABSTRACT

An electronic device according to the present invention includes: a processor, and a memory storing a program which, when executed by the processor, causes the electronic device to generate a combined image by connecting a plurality of images captured using each of a plurality of imaging optical systems; and perform control to perform predetermined notification, in a case where a change amount of a pixel value of a joint area of the combined image between the plurality of images is larger than a threshold.

15 Claims, 14 Drawing Sheets

FISH-EYE IMAGE 401     FISH-EYE IMAGE 402

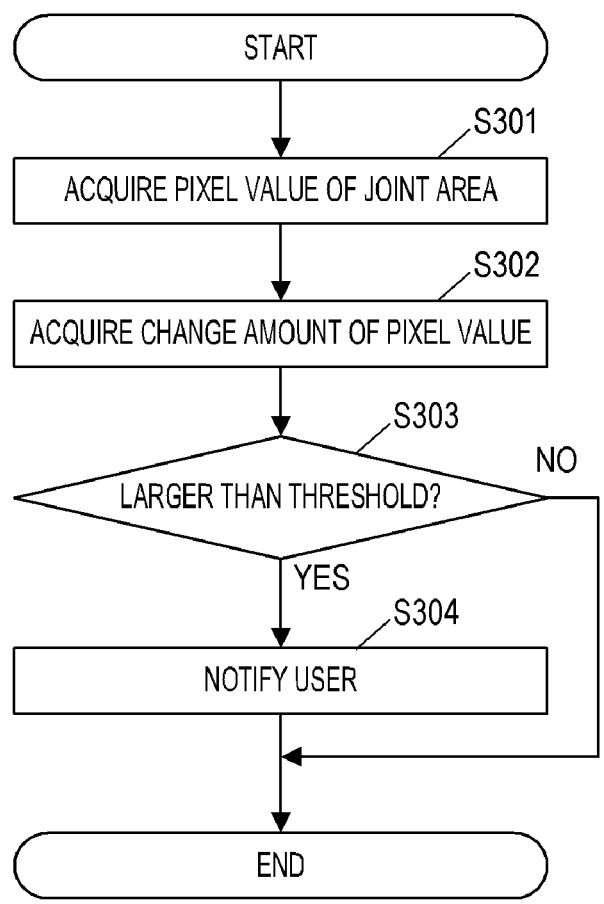

RANGE (DIAGONAL LINE PORTION) IN WHICH CHANGE AMOUNT OF PIXEL VALUE IS LARGER THAN THRESHOLD

MARKER INDICATING RANGE IN WHICH CHANGE AMOUNT OF PIXEL VALUE IS LARGER THAN THRESHOLD

VISIBLE JOINT IN DISPLAY RANGE OF LV DISPLAY

VISIBLE JOINT IN DISPLAY RANGE OF LV DISPLAY

GUIDE INDICATING POSITION OF VISIBLE JOINT AREA

ELECTRONIC DEVICE, CONTROL METHOD OF AN ELECTRONIC DEVICE, AND NON-TRANSITORY COMPUTER READABLE MEDIUM

BACKGROUND OF THE INVENTION

Field of the Invention

The present invention relates to an electronic device, a control method of an electronic device, and a non-transitory computer readable medium.

Description of the Related Art

In recent years, imaging apparatuses (hereinafter, referred to as 360-degree cameras) are widespread that generate 360-degree images by connecting a plurality of images imaged by a plurality of imaging optical systems.

The above 360-degree images are created by connecting a plurality of images imaged using a plurality of imaging optical systems, and therefore a joint between the plurality of images may be visible.

Japanese Patent Application Publication No. 2021-5829 discloses a technique of disabling processing of connecting a plurality of images when a contrast between a plurality of images is a predetermined value or more, and generating an output image showing the plurality of images aligned in one direction.

However, the technique disclosed in Japanese Patent Application Publication No. 2021-5829 cannot enable a user (photographer) to easily ascertain, at a time of photographing, whether or not a joint between a plurality of images is visible in a 360-degree image (combined image) generated by connecting the plurality of images.

SUMMARY OF THE INVENTION

The present invention provides a technology to enable a user to easily ascertain, at a time of photographing, whether or not a joint between a plurality of images is visible in a combined image generated by connecting the plurality of images.

An electronic device according to the present invention includes: a processor; and a memory storing a program which, when executed by the processor, causes the electronic device to generate a combined image by connecting a plurality of images captured using each of a plurality of imaging optical systems; and perform control to perform predetermined notification, in a case where a change amount of a pixel value of a joint area of the combined image between the plurality of images is larger than a threshold.

Further features of the present invention will become apparent from the following description of exemplary embodiments with reference to the attached drawings.

BRIEF DESCRIPTION OF THE DRAWINGS

FIG. 3 is a flowchart illustrating processing of the digital camera according to Embodiment 1;

DESCRIPTION OF THE EMBODIMENTS

Figure 1A:
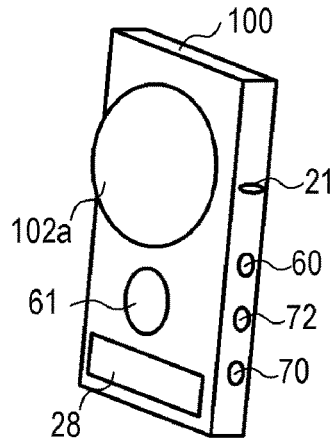
FIGS. 1A to 1C are block diagrams illustrating an external view of a digital camera.

Embodiments of the present invention will be described below with reference to the drawings. Note that the following embodiments do not limit the present invention according to the claims, and all combinations of features described in the present embodiment are not necessarily indispensable for the solution of the present invention. Note that the same components will be assigned the same reference numerals and described.

Embodiment 1

Figure 1B:
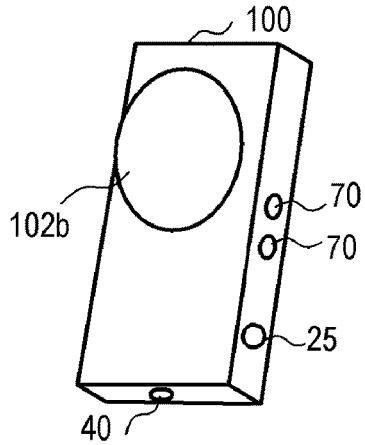

Suitable Embodiment 1 according to the present invention will be described below with reference to the drawings. FIG. 1A illustrates a front perspective view (external view) of a digital camera 100 (imaging apparatus) that is an electronic device. FIG. 1B illustrates a back perspective view (external view) of the digital camera 100. The digital camera 100 is an omnidirectional camera (360-degree camera).

A barrier 102a is a protection window of a photographing lens 103a for a "camera unit A" whose photographing range is a front side of the digital camera 100. The barrier 102a may be the outer face of the photographing lens 103a itself. The "camera unit A" is a wide-angle camera whose photographing range is a wide range equal to or more than 180 degrees in upper, lower, left, and right directions of the front side of the digital camera 100. A barrier 102b is a protection window of a photographing lens 103b for a "camera unit B" whose photographing range is a back side of the digital camera. The barrier 102b may be the outer face of the photographing lens 103b itself. The "camera unit B" is a wide-angle camera whose photographing range is a wide range equal to or more than 180 degrees in the upper, lower, left, and right directions of the back side of the digital camera 100.

A display unit 28 includes a display unit that displays various information. A shutter button 61 is an operation unit for instructing to perform photographing. A mode switching switch 60 is an operation unit for switching various modes. A connection I/F 25 is a connector of a connection cable and the digital camera 100 for connecting with an external device (such as a smartphone, a personal computer, or a television). An operation unit 70 is an operation unit that includes operation members (such as various switches, buttons, dials, and a touch sensor) that accept various operations from a user. A power supply switch 72 is a push button for switching on and off a power supply.

A light-emitting unit 21 is a light-emitting member such as a Light Emitting Diode (LED). The light-emitting unit 21 notifies the user of various states of the digital camera 100 using a light emission pattern or a light emission color. A fixing portion 40 is, for example, a tripod screw hole, and is a member that is fixed to and installed at a fixing tool such as a tripod.

Figure 1C:
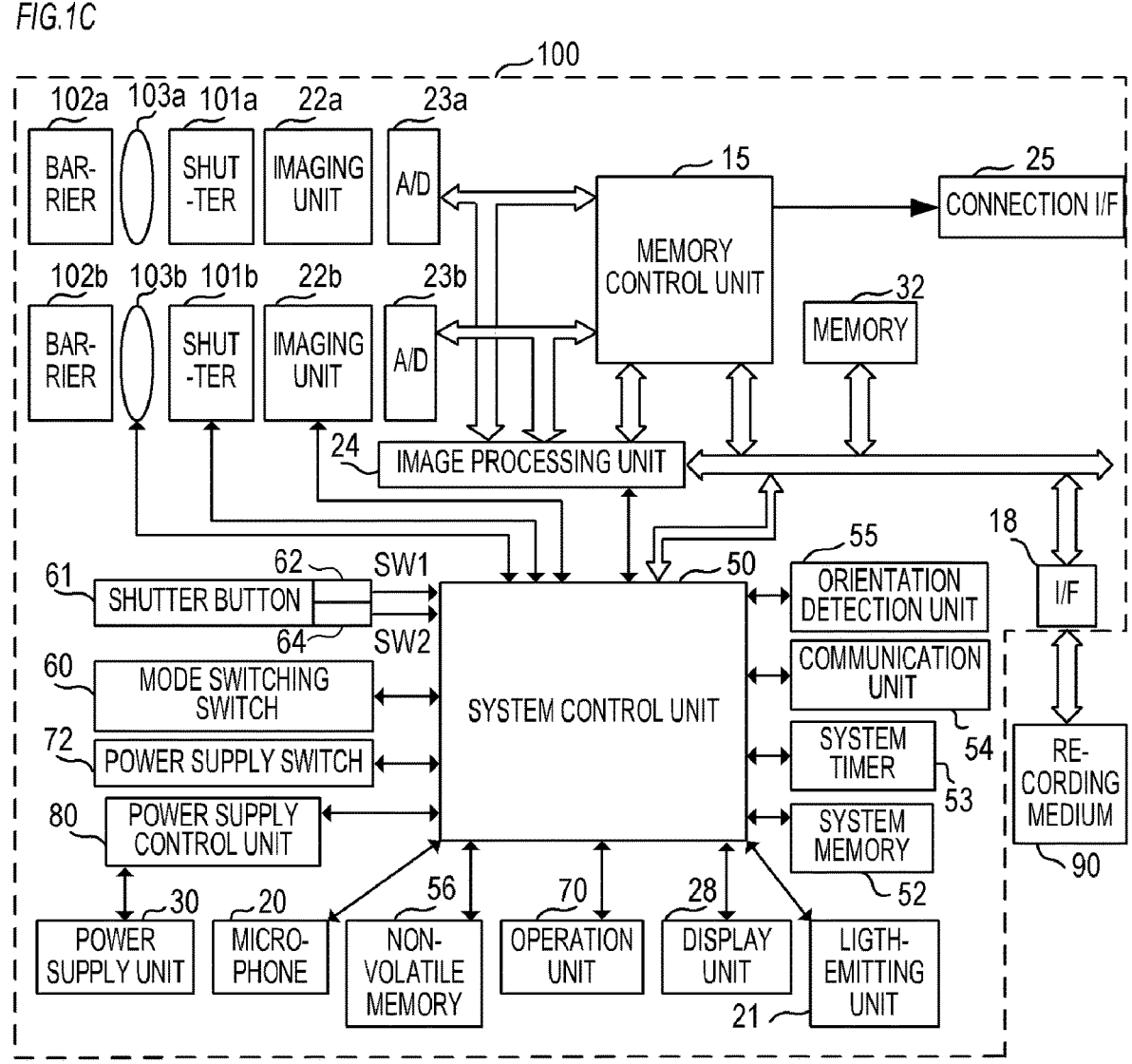

FIG. 1C is a block diagram illustrating a configuration example of the digital camera 100. The barrier 102*a* prevents contamination or damages on an imaging system (including the photographing lens 103*a*, a shutter 101*a*, and an imaging unit 22*a*) by covering the imaging system of the "camera unit A" including the photographing lens 103*a* of the digital camera 100. The photographing lens 103*a* is a lens group, and includes a zoom lens and a focus lens. The photographing lens 103*a* is, for example, a wide-angle lens. The shutter 101*a* is a shutter that has a diaphragm function of adjusting an amount of incidence of object light on the imaging unit 22*a*. The imaging unit 22*a* is an imaging element that includes a CCD or CMOS element or the like that converts an optical image into an electrical signal. An A/D converter 23*a* converts an analog signal output from the imaging unit 22*a* into a digital signal.

The barrier 102*b* prevents contamination or damages on an imaging system (including the photographing lens 103*b*, a shutter 101*b*, and an imaging unit 22*b*) by covering the imaging system of the "camera unit B" including the photographing lens 103*b* of the digital camera 100. The photographing lens 103*b* is a lens group, and includes a zoom lens and a focus lens. The photographing lens 103*b* is, for example, a wide-angle lens. The shutter 101*b* is a shutter that has a diaphragm function of adjusting an amount of incidence of object light on the imaging unit 22*b*. The imaging unit 22*b* is an imaging element that includes a CCD or CMOS element or the like that converts an optical image into an electrical signal. An A/D converter 23*b* converts an analog signal output from the imaging unit 22*b* into a digital signal.

The imaging unit 22*a* and the imaging unit 22*b* image VR images. The VR image is an image that can show VR display. The VR image includes an omnidirectional image (360-degree image) imaged by an omnidirectional camera (360-degree camera), a panoramic image having a video range (effective video range) wider than a display range that can be displayed on a display unit at a time, and the like. The VR image also includes not only a still image, but also a moving image and a live view image (an image acquired in real time from a camera). The VR image has a video range (effective video range) having the field of view of 360 degrees in an upper/lower direction (a vertical angle, and an angle, an elevation angle, a depression angle, and an altitude angle from the zenith) and 360 degrees in a left/right direction (a horizontal angle and an azimuth angle) at maximum. Furthermore, the VR image also includes an image that has a wide angle of view (visual field range) that is wider than an angle of view that is less than 360 degrees in the upper/lower direction and is less than 360 degrees in the left/right direction and at which a normal camera can perform photographing, or has a video range (effective video range) wider than the display range that can be displayed on the display unit at a time. For example, an image photographed by the 360-degree camera that can photograph an object in a visual field (angle of view) of 360 degrees in the left/right direction (the horizontal angle and the azimuth angle) and 210 degrees in vertical angle about the zenith is a type of a VR image.

Furthermore, for example, an image photographed by a camera that can photograph an object in a visual field (angle of view) of 180 degrees in the left/right direction (the horizontal angle and the azimuth angle) and 180 degrees in vertical angle about a horizontal direction is a type of a VR image. That is, an image that has a video range corresponding to the visual field of 160 degrees or more (+80 degrees) in the upper/lower direction and the left/right direction and has a video range wider than a range that people can visually check at a time is a type of a VR image. When this VR image is displayed by VR display (display mode: display in "VR view"), it is possible to view an omnidirectional video without a joint in the left/right direction (horizontal rotation direction) by changing the orientation of a display apparatus in a left/right rotation direction. Although an omnidirectional video without a joint can be viewed in a range of +105 degrees seen from above (zenith) in the upper/lower direction (vertical rotation direction), a range that exceeds 105 degrees from above is a blank area in which there is no video. The VR image can be also referred to as "an image whose video range is at least part of a virtual space (VR space)".

The VR display (VR view) is a display method (display mode) that displays a video of a visual field range matching the orientation of the display apparatus in a VR image and can change the display range. When a video is viewed by attaching a Head Mount Display (HMD) that is the display apparatus, the video in the visual field range matching the direction of a user's face is displayed. For example, a video having a visual field angle (angle of view) about 0 degree (a specific direction such as north) in the left/right direction and 90 degrees (90 degrees from the zenith, that is, the horizontal state) in the upper/lower direction in a VR image at a certain point of time is displayed. When the front and back sides of the orientation of the display unit are reversed from this state (for example, a display surface facing south is changed to face north), the display range is changed to a video having a visual field angle about 180 degrees (an opposite direction such as south) in the left/right direction and 90 degrees (horizontal state) in the upper/lower direction in the same VR image. In a case where the user is viewing the HMD, when the user's face is directed to south from north (that is, the user faces the back), a video displayed on the HMD also changes from a video in north to a video in south. This VR display can provide the user with a visual sense of virtually being in the VR image (in the VR space). A smartphone attached to a VR goggle (head mount adapter) is a type of the HMD.

Note that the display method for VR images is not limited to the above, and the display range may be moved (scrolled) in response to a user operation on a touch panel or a direction button instead of a change in the orientation. At a time of display by VR display (VR view mode), too, the display range may be also changed according to a touch move operation on the touch panel or a drag operation on an operation member such as the mouse in addition to a change of the display range caused in response to the change in the orientation.

An image processing unit 24 performs resize processing (processing such as predetermined pixel interpolation or reduction) and color conversion processing on data from the A/D converter 23*a* or the A/D converter 23*b* or data from a memory control unit 15. Furthermore, the image processing unit 24 performs predetermined arithmetic operation processing using imaged image data. A system control unit 50 performs exposure control and distance measurement control on the basis of an arithmetic operation obtained by the image processing unit 24. Thus, Automatic Focus (AF) processing, Automatic Exposure (AE) processing, pre-flash (EF) processing of the Through The Lens (TTL) system are performed. The image processing unit 24 further performs predetermined arithmetic operation processing using imaged image data, and performs Automatic White Balance (AWB) processing of the TTL system on the basis of the obtained arithmetic operation result.

Furthermore, the image processing unit 24 performs basic image processing on two images (fish-eye images) obtained from the A/D converter 23a and the A/D converter 23b, then synthesizes the images (image connection processing), and generates a single VR image. According to the image connection processing of the two images, the image processing unit 24 calculates a shift amount of a reference image and a comparison image from each of the two images per area by pattern matching processing, and detects a connection position. Furthermore, taking the detected connection position and characteristics of each optical system lens into account, the image processing unit 24 corrects distortion by performing geometric transformation on each of the two images, and converts the two images into a 360-degree image format. By blending the two images of the 360-degree image format, the image processing unit 24 finally generates one 360-degree image (VR image). The generated 360-degree image (VR image) becomes an image obtained using the equidistant projection method, so that the position of each pixel can be associated with coordinates on the surface of a sphere. Furthermore, at a time of VR display in live view or at a time of playback, image clip processing, enlargement processing, distortion correction, and the like for showing a VR image by VR display are performed, and rendering for drawing the VR image in a VRAM of a memory 32 is also performed.

Output data from the A/D converters 23a and 23b is written in the memory 32 via the image processing unit 24 and the memory control unit 15 or via the memory control unit 15. The memory 32 stores image data obtained by imaging units 22a and 22b and converted into digital data by the A/D converters 23a and 23b, and images to output from the connection I/F 25 to an external display. The memory 32 has a sufficient storage capacity for storing a predetermined number of still images, and moving images and audios of a predetermined time.

Furthermore, the memory 32 also functions as an image display memory (video memory). Image display data stored in the memory 32 can be output from the connection I/F 25 to the external display. VR images (that are VR images imaged by the imaging units 22a and 22b and generated by the image processing unit 24 and that are accumulated in the memory 32) are sequentially transferred to the display, and these VR images are displayed. Thus, it is possible to perform live view display (LV display) of the VR images. Hereinafter, an image displayed by live view will be referred to as an LV image. Furthermore, by transferring the VR images accumulated in the memory 32 to an external device (such as a smartphone) wirelessly connected via a communication unit 54, and displaying the VR images on the external device side, it is also possible to perform live view display (remote LV display).

A non-volatile memory 56 is a memory that is an electrically erasable and recordable recording medium. As the non-volatile memory 56, for example, an EEPROM or the like is used. The non-volatile memory 56 stores constants, programs, and the like for operations of the system control unit 50. The programs described here are computer programs for executing processing in various flowcharts to be described later.

The system control unit 50 is a control unit that includes at least one processor or circuit, and controls the entire digital camera 100. The system control unit 50 implements each processing according to each embodiment by executing the programs recorded in the non-volatile memory 56. As a system memory 52, for example, a RAM is used. In the system memory 52, the constants, variables, the programs read from the non-volatile memory 56, and the like for the operations of the system control unit 50 are expanded. Furthermore, the system control unit 50 also performs display control by controlling the memory 32, the image processing unit 24, and the memory control unit 15.

A system timer 53 is a time measurement unit that measures a time (times used for various control, and a time of a built-in clock).

The mode switching switch 60, the shutter button 61, and the operation unit 70 are operation members for inputting various operation instructions to the system control unit 50. The mode switching switch 60 switches an operation mode of the system control unit 50 to a still image recording mode, a moving image shooting mode, a playback mode, a communication connection mode, and the like. Modes included in the still image recording mode include automatic photographing mode, an automatic scene determination mode, a manual mode, a diaphragm prioritized mode (Av mode), a shutter speed prioritized mode (Tv) mode, and a program AE mode. Furthermore, modes included in the still image recording mode include various scene modes and a custom mode that are photographing settings per photographing scene. The user can use the mode switching switch 60 to directly switch the mode to one of these modes. Alternatively, the user may use the mode switching switch 60 to switch to a list screen of the photographing mode once, then select one of a plurality of modes displayed on the display unit 28, and switch the mode using another operation member. Similarly, the moving image photographing mode may also include a plurality of modes.

A first shutter switch 62 is turned on by so-called half-press (photographing preparation instruction) during an operation of the shutter button 61 provided to the digital camera 100, and generates a first shutter switch signal SW1. The system control unit 50 starts a photographing preparation operation such as Automatic Focus (AF) processing, Automatic Exposure (AE) processing, Automatic White Balance (AWB) processing, pre-flash (EF) processing in response to generation of the first shutter switch signal SW1.

A second shutter switch 64 is turned on by so-called full press (photographing instruction) when the operation of the shutter button 61 is completed, and generates a second shutter switch signal SW2. The system control unit 50 starts an operation of a series of photographing processing from reading of a signal from the imaging units 22a and 22b to writing of image data in a recording medium 90 in response to generation of the second shutter switch signal SW2.

Note that the shutter button 61 is not limited to a member that can be operated at two stages of full-press and half-press, and may be an operation member that can be operated only at one stage of push. In this case, the photographing preparation operation and the photographing processing are continuously performed at the one stage of push. This operation is the same operation in a case where the shutter button that can be pressed half and pressed fully is sort of fully pressed (an operation in a case where SW1 and SW2 are generated substantially simultaneously).

The operation members of the operation unit 70 function as various function buttons to which functions are assigned as appropriate per scene by performing an operation of selecting various function icons or options displayed on the display unit 28. Examples of the function buttons include an end button, a back button, an image forward button, a jump button, a narrow-down button, an attribute button, and the like. When, for example, a menu button is pushed, a menu screen on which various settings can be made is displayed on the display unit 28. The user can intuitively make various settings by operating the operation unit 70 while looking at the menu screen displayed on the display unit 28.

The power supply control unit 80 includes a battery detection circuit, a DC-DC converter, a switch circuit (a circuit that switches a block to distribute power to), and the like. The power supply control unit 80 detects whether or not a battery is attached, a type of the battery, and a remaining battery level. Furthermore, the power supply control unit 80 controls the DC-DC converter on the basis of a detection result and an instruction from the system control unit 50, and supplies a necessary voltage to each unit (including the recording medium 90) during a necessary period. A power supply unit 30 includes a primary battery (such as an alkaline battery or a lithium battery), a secondary battery (such as a NiCd battery, a NiMH battery, or a Li battery), an AC adapter, and the like.

A recording medium I/F 18 is an interface for the recording medium 90 (such as a memory card or a hard disk). The recording medium 90 is a recording medium such as a memory card for recording photographed images. The recording medium 90 includes a semiconductor memory, an optical disk, a magnetic disk, or the like. The recording medium 90 may be an interchangeable recording medium that can be attached to and detached from the digital camera 100, or may be a recording medium that is built in the digital camera 100.

The communication unit 54 connects to the external device wirelessly or via a wired cable, and transmits and receives video signals, audio signals, and the like. The communication unit 54 can also connect to a wireless LAN and the Internet. The communication unit 54 can transmit images (including LV images) imaged by the imaging unit 22a or the imaging unit 22b, and images recorded in the recording medium 90. Furthermore, the communication unit 54 can receive images and other various information from the external device.

A orientation detection unit 55 detects the orientation of the digital camera 100 with respect to a gravity direction. It is possible to determine on the basis of the orientation detected by the orientation detection unit 55 whether an image photographed by the imaging units 22a and 22b is an image photographed by horizontally holding the digital camera 100 or an image photographed by vertically holding the digital camera 100. Furthermore, it is possible to determine to what extent the orientation is inclined in three axial directions of a yaw, a pitch, and a roll to photograph the image photographed by the imaging units 22a and 22b. The system control unit 50 can add orientation information matching the orientation detected by the orientation detection unit 55 to image files of VR images imaged by the imaging units 22a and 22b. Furthermore, the system control unit 50 can also rotate an image according to the detected orientation (adjust the orientation of the image to correct an inclination), and record the image. The orientation detection unit 55 can be used in combination with one or more of an acceleration sensor, a gyro sensor, a geomagnetic sensor, an azimuth sensor, an altitude sensor, and the like. It is also possible to detect the motion of the digital camera 100 (whether or not the digital camera 100 is panned, tilted, or lifted, or stops) using the orientation detection unit 55 (the acceleration sensor, the gyro sensor, and an azimuth angle sensor).

A microphone 20 is a microphone that collects audios in the surroundings of the digital camera 100 recorded as audios of a moving image of a VR image. The connection I/F 25 is a connection plug for an HDMI (registered trademark) cable, a USB cable, or the like for connecting with the external device and transmitting and receiving videos.

Figure 2A:
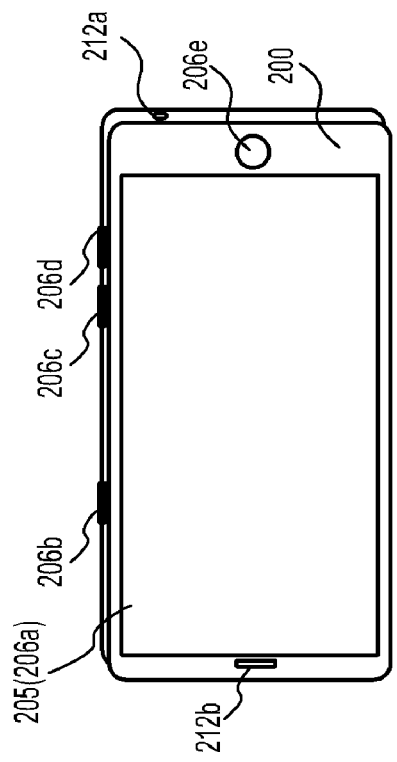
FIGS. 2A and 2B are block diagrams illustrating an external view of a display control apparatus.

FIG. 2A illustrates an example of an external view of a display control apparatus 200 that is a type of an electronic device. A display 205 includes a display unit that displays images and various information. The display 205 is formed integrally with a touch panel 206a as described later. Hence, the display control apparatus 200 can detect a touch operation on a display surface of the display 205. The display control apparatus 200 can show VR display of a VR image (VR content) on the display 205.

An operation unit 206 includes the touch panel 206a, and operation portions 206b, 206c, 206d, and 206e. The operation portion 206b is a power supply button that accepts an operation of switching on and off a power supply of the display control apparatus 200. The operation portion 206c and the operation portion 206d are volume buttons that increase and decrease a volume of an audio output from an audio output unit 212. The operation portion 206e is a home button for displaying a home screen on the display 205. An audio output terminal 212a is an earphone jack, and is a terminal that outputs audios to earphones and an external speaker. A speaker 212b is a main body built-in speaker that emits audios.

Figure 2B:
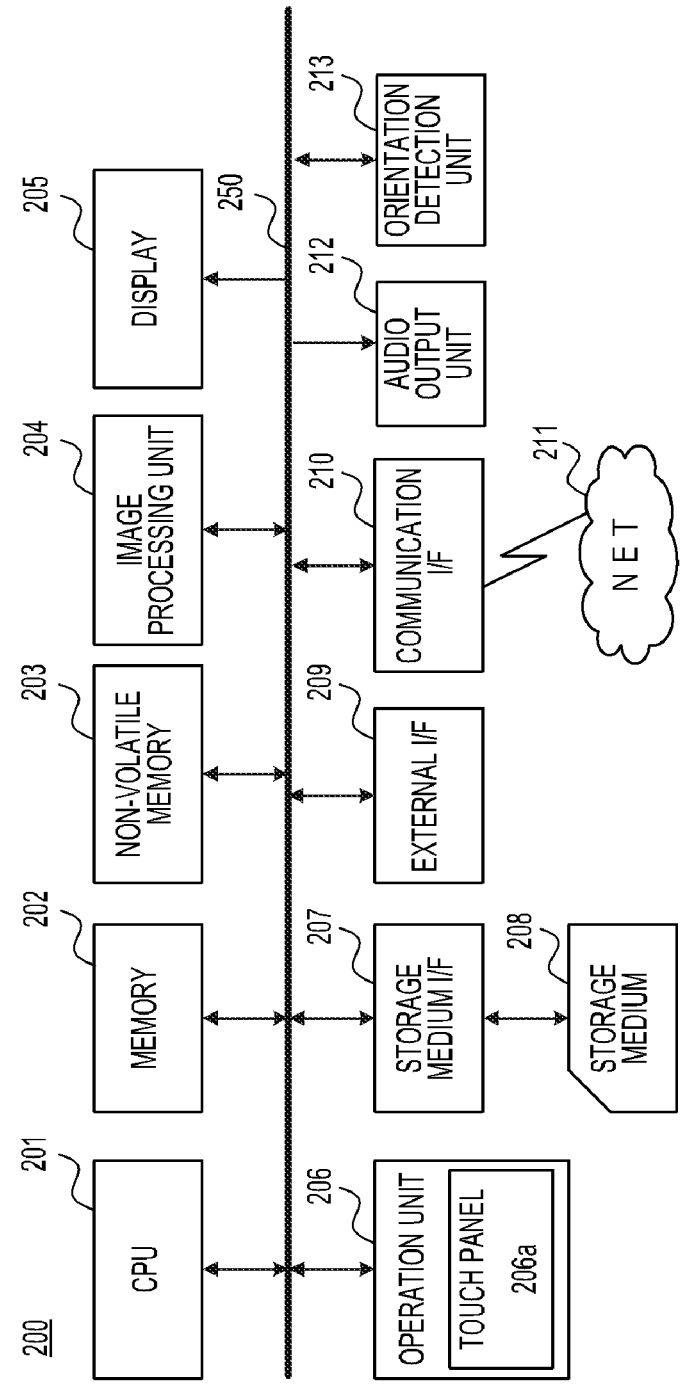

FIG. 2B illustrates an example of a configuration of the display control apparatus 200. The display control apparatus 200 can be configured using a display apparatus such as a smartphone. An internal bus 250 is connected with a CPU 201, a memory 202, a non-volatile memory 203, an image processing unit 204, the display 205, an operation unit 206, a storage medium I/F 207, an external I/F 209, and a communication I/F 210. Furthermore, the internal bus 250 is also connected with the audio output unit 212 and a orientation detection unit 213. Each unit connected to the internal bus 250 can exchange data with each other via the internal bus 250.

The CPU 201 is a control unit that controls the entire display control apparatus 200, and includes at least one processor or circuit. The memory 202 includes, for example, a RAM (a volatile memory that uses a semiconductor element). The CPU 201 controls each unit of the display control apparatus 200 using the memory 202 as a working memory according to, for example, programs stored in the non-volatile memory 203. The non-volatile memory 203 stores image data, audio data, other data, various programs for the CPU 201 to operate, and the like. The non-volatile memory 203 includes, for example, a flash memory, a ROM or the like.

The image processing unit 204 performs various image processing on images (images stored in the non-volatile memory 203 and the storage medium 208, video signals acquired via the external I/F 209, and images acquired via the communication I/F 210) on the basis of control of the CPU 201. The image processing performed by the image processing unit 204 includes A/D conversion processing, D/A conversion processing, and encoding processing, compression processing, decoding processing, enlargement/reduction processing (resize), noise reduction processing, color conversion processing, and the like for image data. Furthermore, the image processing unit 204 also performs various image processing such as panorama expansion, mapping processing, and conversion on a VR image that is a wide range image (that is an omnidirectional image, yet is not limited to an omnidirectional image) having data of a wide range. The image processing unit 204 may include a dedicated circuit block for performing specific image processing. Furthermore, the CPU 201 can also perform image processing according to the program without using the image processing unit 204 depending on a type of the image processing.

The display 205 displays a GUI screen that constitutes an image and a Graphical User Interface (GUI) on the basis of control of the CPU 201. The CPU 201 generates a display control signal according to the program, and controls each unit of the display control apparatus 200 (performs control to generate a video signal to display on the display 205 and output the video signal to the display 205). The display 205 displays a video on the basis of the video signal. Note that the components included in the display control apparatus 200 itself are an interface for outputting video signals to display on the display 205, and the display 205 may be configured as an external monitor (such as a television).

The operation unit 206 is an input device that accepts a user operation. The operation unit 206 includes a character information input device (such as a keyboard), a pointing device (such as a mouse or a touch panel), buttons, dials, a joystick, a touch sensor, a touch pad, and the like. Note that the touch panel is an input device that is planarly configured by being overlaid on the display 205, and outputs coordinate information matching a touched position.

The storage medium 208 (a memory card, a CD, or a DVD) is attachable to the storage medium I/F 207. The storage medium I/F 207 reads data from the attached storage medium 208 and writes data in the storage medium 208 on the basis of control of the CPU 201. The external I/F 209 is an interface for connecting with the external device via a wired cable or wirelessly, and inputting and outputting video signals and audio signals. The communication I/F 210 is an interface for communicating with the external device or a network 211, and transmitting and receiving various data such as files and commands.

The audio output unit 212 outputs audios, operation sounds, ringtones, various notification sounds, and the like of moving images and music data. The audio output unit 212 includes the audio output terminal 212a (a terminal that connects with earphones) and the speaker 212b. The audio output unit 212 may output an audio by wireless communication or the like.

The orientation detection unit 213 detects a orientation of the display control apparatus 200 in the gravity direction, and an inclination of the orientation with respect to the axes of the yaw, the roll, and the pitch. On the basis of the orientation detected by the orientation detection unit 213, it is possible to determine whether the display control apparatus 200 is held horizontally, is held vertically, is directed upward, is directed downward, or takes an inclined orientation. For the orientation detection unit 213, at least one of an acceleration sensor, a gyro sensor, a geomagnetic sensor, an azimuth sensor, an altitude sensor, and the like can be used, and a plurality of these sensors can be also combined and used.

Note that the operation unit 206 includes the touch panel 206a. The CPU 201 can detect following operations on the touch panel 206a or following states.

A finger or a pen that has not been in touch with the touch panel 206a newly touches the touch panel 206a, that is, touch starts (hereinafter, referred to as touch-down)

The finger or the pen is in touch with the touch panel 206a (hereinafter, referred to as touch-on)

The finger or the pen is moving in touch with the touch panel 206a (hereinafter, referred to as touch-move).

The finger or the pen in touch with the touch panel 206a separates from the touch panel 206a, that is, touch ends (hereinafter, referred to as touch-up).

Nothing is in touch with the touch panel 206a (hereinafter, referred to as touch-off)

When touch-down is detected, touch-on is also detected at the same time. After touch-down, as long as touch-up is not detected, touch-on generally continues being detected. When touch-move is detected, too, touch-on is also detected at the same time. Even when touch-on is detected, if a touch position is not moving, touch-move is not detected. When touch-up of all of the touching finger and pen is detected, touch-off is detected.

These operations and states, and position coordinates that the finger or the pen touches on the touch panel 206a are notified to the CPU 201 through the internal bus, and the CPU 201 determines what operation (touch operation) has been performed on the touch panel 206a on the basis of notified information. As for touch-move, the CPU 201 can determine a moving direction of the finger or the pen that moves on the touch panel 206a per vertical component/horizontal component on the touch panel 206a on the basis of a change in the position coordinates. When it is detected that touch-move has been performed over a predetermined distance or more, it is determined that a slide operation has been performed. An operation of quickly moving the finger over a certain distance while touching the touch panel 206a, and then separating the finger is referred to as flick. In other words, flick is an operation of quickly tracing the touch panel 206a snapping the touch panel 206a. When it is detected that touch-move has been performed over a predetermined distance at a predetermined speed or more, and then touch-up is detected, it is possible to determine that flick has been performed (it is possible to determine that flick has been performed subsequently to the slide operation).

Furthermore, a touch operation of simultaneously touching a plurality of portions (e.g., two points) and bringing the respective touch positions close to each other is referred to as pinch-in, and a touch operation of bringing the respective touch positions away from each other is referred to as pinch-out. Pinch-out and pinch-in will be collectively referred to as a pinch operation (or simply as pinch). As the touch panel 206a, a touch panel that adopts any system among touch panels of various systems such as a resistive film system, a capacitance system, a surface acoustic wave system, an infrared system, an electromagnetic induction system, an image recognition system, and an optical sensor system. Although there is a system that detects touch when a touch panel is touched, and a system that detects touch when a finger or a pen approaches a touch panel, any system can be adopted.

The storage medium 208 stores data such as images to display on the display 205. The CPU 201 records and reads the data in and from the storage medium 208 via the storage medium I/F 207.

The external I/F 209 is an interface for performing data communication with the external device when a USB cable or the like is inserted in the display control apparatus 200. The communication I/F 210 is an interface for performing data communication with the external network 211 via wireless communication.

The audio output unit 212 outputs an audio of content to be played back by the display control apparatus 200. The orientation detection unit 213 detects the orientation of the display control apparatus 200, and notifies the CPU 201 of orientation information.

Next, a flow of processing of the digital camera 100 will be described with reference to the flowchart in FIG. 3. The processing in FIG. 3 is implemented by the system control unit 50 by expanding in the system memory 52 the program stored in the non-volatile memory 56 and executing the program. The system control unit 50 starts the processing in FIG. 3 when detecting generation of the first shutter switch signal SW1.

A fish-eye image imaged by the imaging unit 22a and a fish-eye image imaged by the imaging unit 22b are connected (combined) to generate a 360-degree image (combined image) in some cases. In this case, a joint between the two images may be visible in the 360-degree image. Particularly in a case where different imaging parameters are set to the imaging unit 22a and the imaging unit 22b, the joint is more likely to be visible. Hence, in the present embodiment, the processing in FIG. 3 is performed to enable the user to easily grasp at a time of photographing whether or not a joint is visible in a 360-degree image.

In S301, the system control unit 50 acquires a pixel value of a joint area to be described later from each of the two fish-eye images imaged by the imaging units 22a and 22b.

Figure 4A:
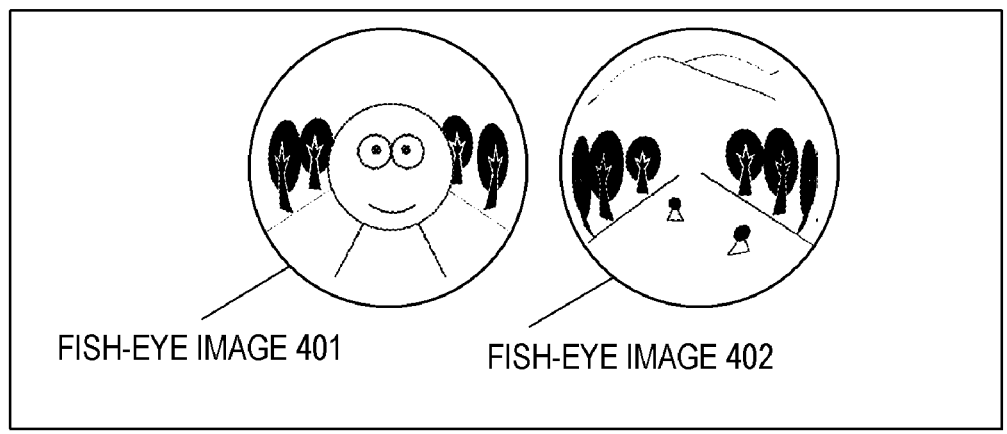
FIGS. 4A and 4B are schematic views of fish-eye images and a joint area.

A fish-eye image 401 illustrated in FIG. 4A is a fish-eye image imaged by the imaging unit 22a, and a fish-eye image 402 is a fish-eye image imaged by the imaging unit 22b. Since there is a person on the imaging unit 22a side, the fish-eye image 401 shows this person, and, since there is only a scenery on the imaging unit 22b side, the fish-eye image 402 shows only the scenery. Here, it is assumed that an imaging parameter set to match with the respective objects is individually set to the imaging units 22a and 22b.

Figure 4B:
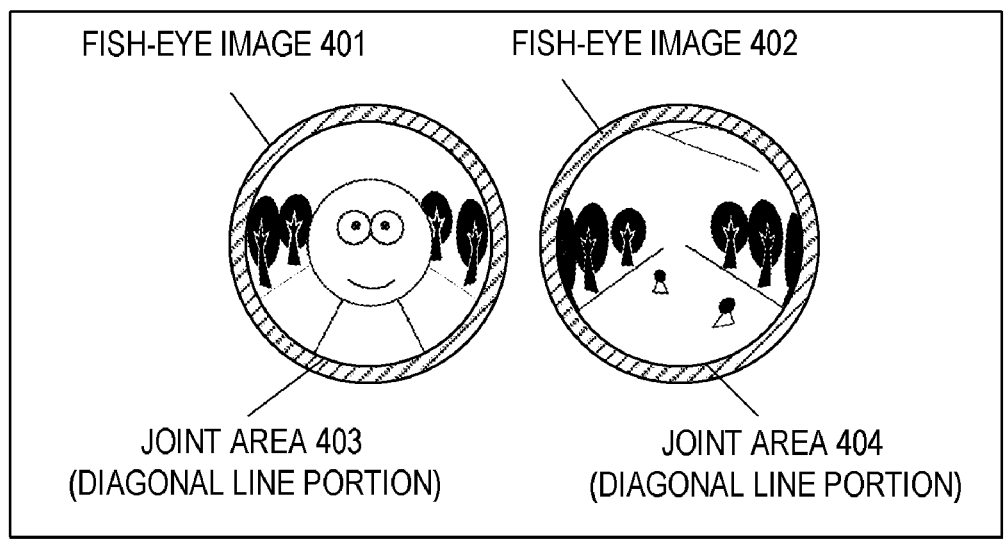

FIG. 4B is a view for describing definition of a joint area. The circumferences (outer circumference) of the fish-eye images 401 and 402 are used as joints, and corresponding positions are adjusted to connect the fish-eye images 401 and 402, and generate a 360-degree image. Furthermore, a joint area 403 that is a pixel value acquisition target is an area that has a width W (W pixels) from the circumference of the fish-eye image 401, and a joint area 404 is an area that has the width W from the circumference of the fish-eye image 402.

Figure 5:
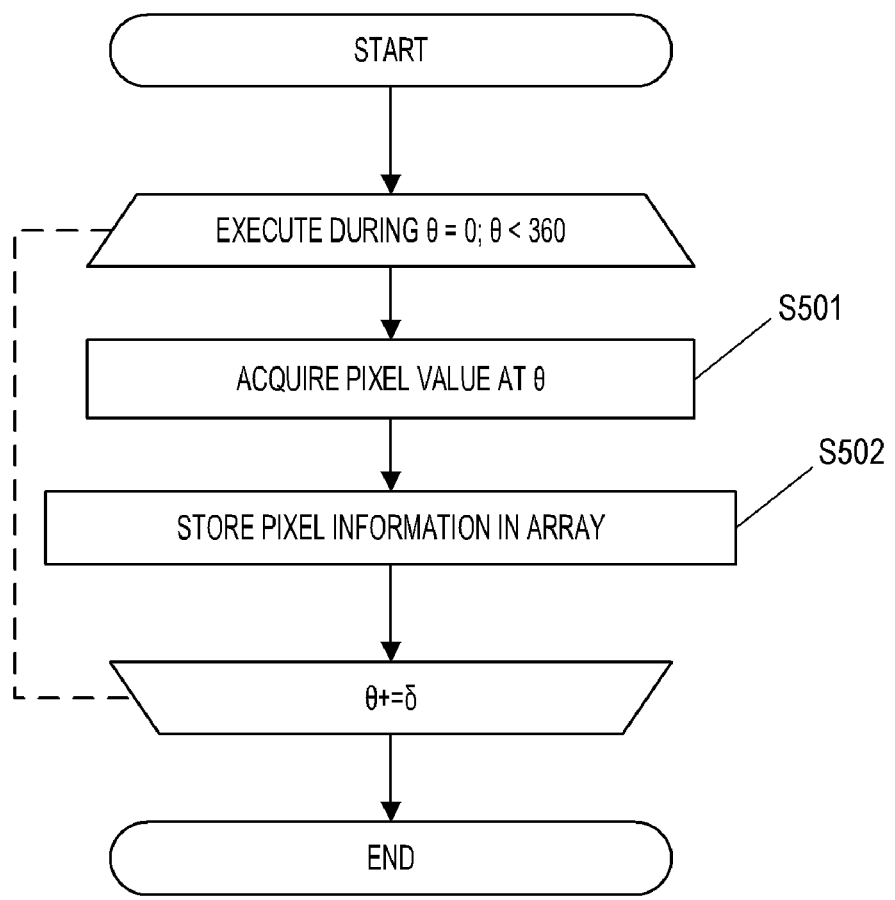
FIG. 5 is a flowchart illustrating processing in S301 in FIG. 3.

FIG. 5 is a flowchart illustrating the flow of processing in S301 in detail. Here, the system control unit 50 repeats processing in S501 and S502 while increasing an angle θ by an angle δ at a time starting from 0° as an initial value of the angle θ until the angle θ exceeds 360°. Angle θ=0° corresponds to, for example, a zenith direction. The angle δ is an arbitrary angle smaller than 180°.

In S501, the system control unit 50 acquires a pixel value of a pixel group (part of the joint area) from each of the two fish-eye images imaged by the imaging units 22a and 22b according to the angle θ.

Figure 6A:
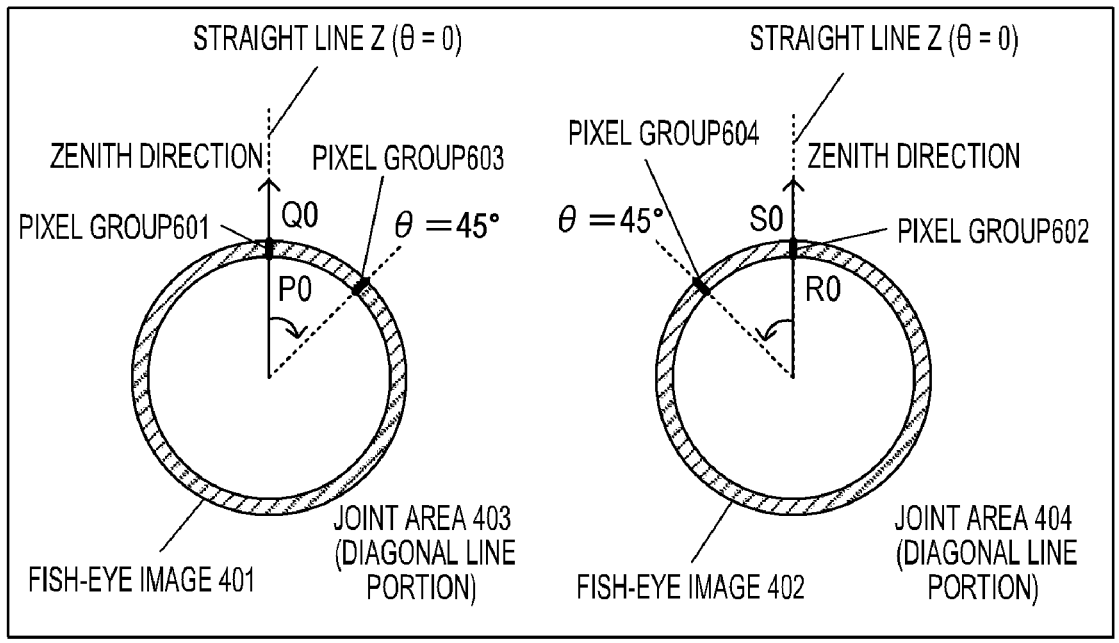
FIGS. 6A and 6B are schematic views of a method for designating pixel groups that are pixel value acquisition targets.

FIG. 6A is a view for describing a method for designating a pixel group that is a pixel value acquisition target. Since the imaging unit 22a and 22b are disposed with the backs thereof opposing to each other, a straight-line Z drawn from the center of the 360-degree image toward the zenith direction is common between the fish-eye images 401 and 402. Furthermore, a clockwise direction from the straight-line Z in the fish-eye image 401, and a counterclockwise direction from the straight-line Z in the fish-eye image 402 correspond to each other. In the fish-eye image 401, when the angle θ is designated, a pixel group on a line segment that is a common portion of a straight line obtained by rotating the straight-line Z clockwise at the angle θ about the center of the 360-degree image, and the joint area 403 is designated. In the fish-eye image 402, when the angle θ is designated, a pixel group on a line segment that is a common portion of a straight line obtained by rotating the straight-line Z counterclockwise at the angle θ about the center of the 360-degree image, and the joint area 404 is designated. In a case of, for example, angle θ=0°, pixel groups that are pixel value acquisition targets are a pixel group 601 that exists on a line segment P0Q0 and a pixel group 602 that exists on a line segment R0S0 in FIG. 6A. In a case of, for example, angle θ=45°, pixel groups that are pixel value acquisition targets are pixel groups 603 604 in FIG. 6A. Since the length of a line segment on each fish-eye image designated by designating the angle θ corresponds to W pixels, each pixel group includes the W pixels.

Note that there is a case where there is no pixel (the center of pixels) on a line segment corresponding to the angle θ. In such a case, a nearest neighbor method for acquiring a pixel value of the nearest pixel to a target position (a position on the line segment corresponding to the angle θ), a bilinear method for acquiring a weighted average of a plurality of pixel values using a weight matching a distance from the target position to a pixel, and the like may be used.

Figure 6B:
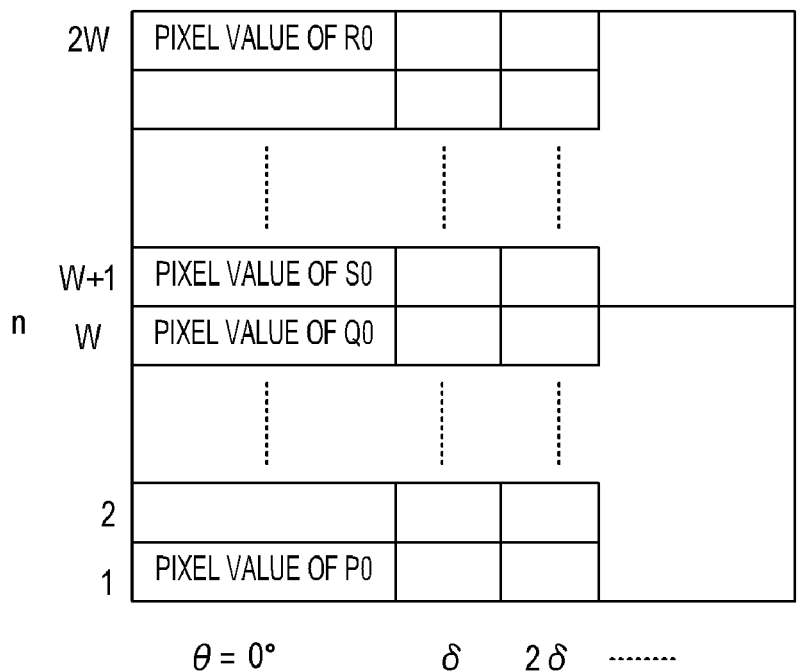

In S502, the system control unit 50 stores in an array the pixel values acquired in S501. FIG. 6B is a view schematically illustrating the array in which the pixel values are stored in S502. The array in FIG. 6B is a two-dimensional array, and the system control unit 50 stores angles θ and the pixel values obtained from the pixel group 601 and the pixel group 603 at portions of index n=1 to W. Similarly, the system control unit 50 stores angles θ and the pixel values obtained from the pixel group 602 and the pixel group 604 at portions of index n=W+1 to 2 W. The W pixel values in the pixel group are respectively associated with the W index n (1 to W or W+1 to 2 W). In a case of, for example, the angle θ=0°, pixel values obtained from respective pixels on the line segment P0R0 in the 360-degree image are sequentially stored from a portion of index n=1 to a portion of index n=2 W. A pixel value obtained from a pixel at a position of a point P0 illustrated in FIG. 6A is stored at the portion of index n=1, and a pixel value obtained from a pixel at a position of a point Q0 is stored at the portion of index n=W. Similarly, a pixel value obtained from a pixel is stored at a position of a point S0 at the portion of index n=W+1, and a pixel value obtained from a pixel at a position of the point R0 illustrated is stored at the portion of index n=2 W. The pixel values stored here are assumed as brightness values, color space coordinates (chromaticity coordinates), color difference values, and the like. The color space coordinates are assumed as YUV color space coordinates (YCbCr color space coordinates), RGB color space coordinates, Lab color space coordinates, and the like.

The description returns to explanation of FIG. 3. In S302, the system control unit 50 acquires change amounts of pixel values from the pixel values acquired in S301 (the pixel values stored in the array in FIG. 6B).

Figure 7A:
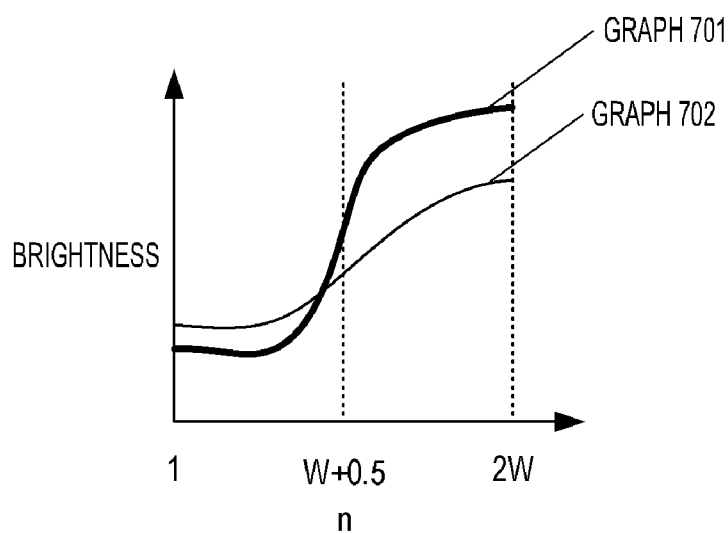
FIGS. 7A and 7B are schematic views illustrating a method for calculating a change amount of a pixel value.

A method for acquiring change amounts of brightness values will be described as an example of the change amounts of the pixel values. FIG. 7A illustrates a coordinate plane that has the horizontal axis that indicates the index n of the array, and the vertical axis that indicates the brightness value of each pixel. A graph 701 and a graph 702 drawn on the coordinate plane are approximate curves of the two-dimensional array obtained in S502, and correspond to different angles θ.

The system control unit 50 calculates, for example, an inclination at a position of index n=W+0.5 in the graph 701 and the graph 702, and acquires an absolute value of the calculated inclination as the change amount of the brightness value. For example, in an example in FIG. 7A, the change amount of the brightness value acquired from the graph 702 is larger than the change amount of the brightness value acquired from the graph 701. The system control unit 50 acquires the change amount of the brightness value for each angle θ(=0, δ, 2δ, 3δ, and . . . ).

Note that the change amount of the pixel value may be a difference between an average value of the brightness values stored in index n=1 to W, and an average value of the brightness values stored in index n=W+1 to 2 W. The change amount of the pixel value may be a difference between the brightness value stored in index n=W, and the brightness value stored in index n=W+1.

Next, in S303, the system control unit 50 determines whether or not the change amounts of the pixel values obtained in S302 are larger than a threshold. In a case where the change amounts of the pixel values are larger than the threshold, the flow moves to S304, and, in a case where the change amounts are not larger than the threshold, the processing in FIG. 3 is finished.

The threshold that serves as a determination criterion is a value that is set using as a reference a lower limit value of the change amounts of the pixel values at which a joint is visible in a 360-degree image. This threshold may be a fixed value stored in advance in the non-volatile memory 56, or may be a value (changeable value) designated in advance by the user. Furthermore, the change amount of the pixel value is acquired for each angle θ, and there may be a mix of an angle θ at which the change amount of the pixel value is larger than the threshold, and an angle θ at which the change amount of the pixel value is the threshold or less. In this case, when the number of the angles θ at which the change amounts of the pixel values are larger than the threshold is larger than the number of the angles θ at which the change amounts of the pixel values are the threshold or less, a determination result that the change amounts of the pixel values are larger than the threshold may be obtained as a final (comprehensive) determination result. Furthermore, when the number of the angles θ at which the change amounts of the pixel values are larger than the threshold is equal to or less than the number of the angles θ at which the change amounts of the pixel values are the threshold or less, a determination result that the change amounts of the pixel values are the threshold or less may be obtained as a final (comprehensive) determination result.

Figure 8A:
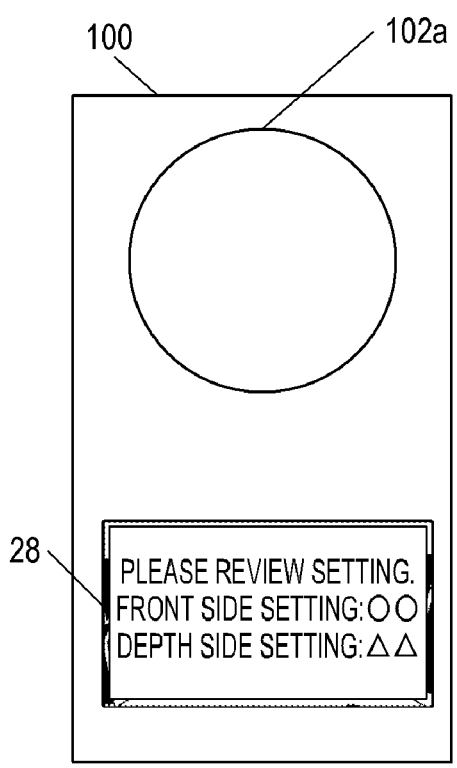
FIGS. 8A and 8B are schematic views of guides that encourage to change an imaging parameter.
Figure 8B:
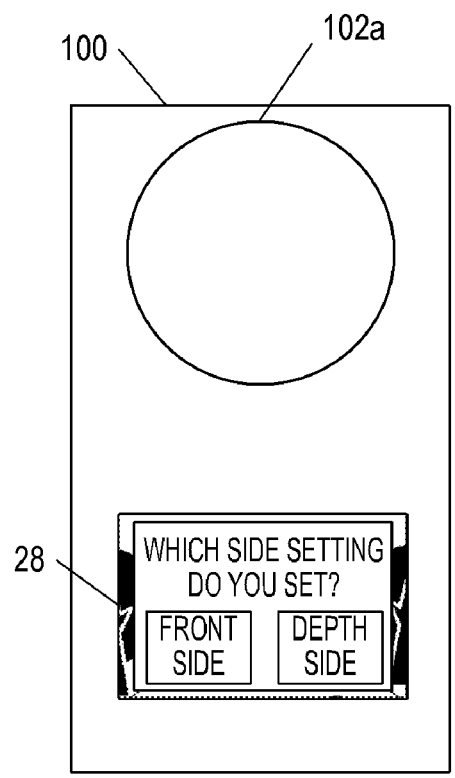

In S304, the system control unit 50 performs predetermined notification for the user. The predetermined notification is performed by, for example, turning on or flashing the light-emitting unit 21. In a case where the digital camera 100 includes an actuator, the predetermined notification may be performed as vibration. An image (such as a warning) may be displayed on the display 205 of the display control apparatus 200 via the communication unit 54, or a warning sound may be output from the speaker 212b to perform the predetermined notification. As illustrated in FIGS. 8A and 8B, a guide that encourages to change the imaging parameter may be displayed on the display unit 28 to perform the predetermined notification. In this case, only a message that encourages to change the imaging parameter may be displayed as illustrated in FIG. 8A, or how to change the imaging parameter may be selected as illustrated in FIG. 8B.

When the display unit 28 or the display 205 of the display control apparatus 200 shows live view display (LV display), it is possible to provide more detailed information to the user by performing notification in combination with the live view display. An example where, when there is an angle at which a change amount of a pixel value is larger than the threshold at a time of photographing, notification in S304 is performed in combination with live view display on the display unit 28 will be described with reference to FIGS. 9A to 9C, 10A, 10B, and 11.

Figure 9A:
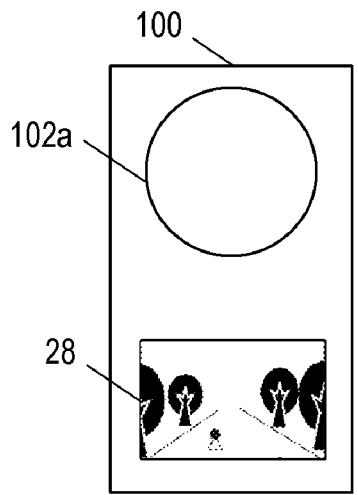
FIGS. 9A to 9C are schematic views of an item that indicates a position of a change portion.

FIG. 9A is a view illustrating a state of live view display before notification is performed. The system control unit 50 displays part of a 360-degree image as a display range on the display unit 28 (VR display). In FIG. 9A, the display range is set such that the center (a position corresponding to the optical axes of the imaging units 22a and 22b) of one of two fish-eye images photographed by the imaging units 22a and 22b becomes the center of the display range.

Figure 9B:
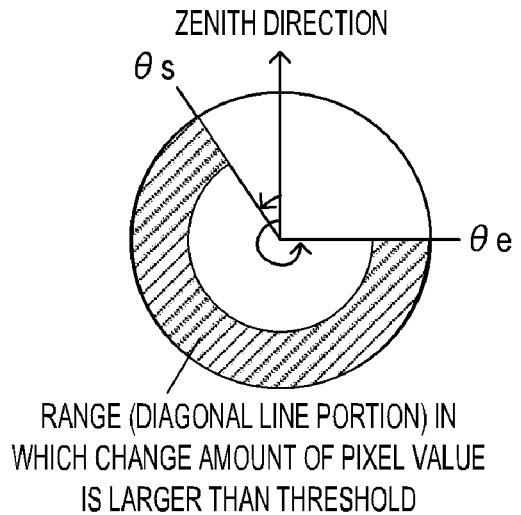
Figure 9C:
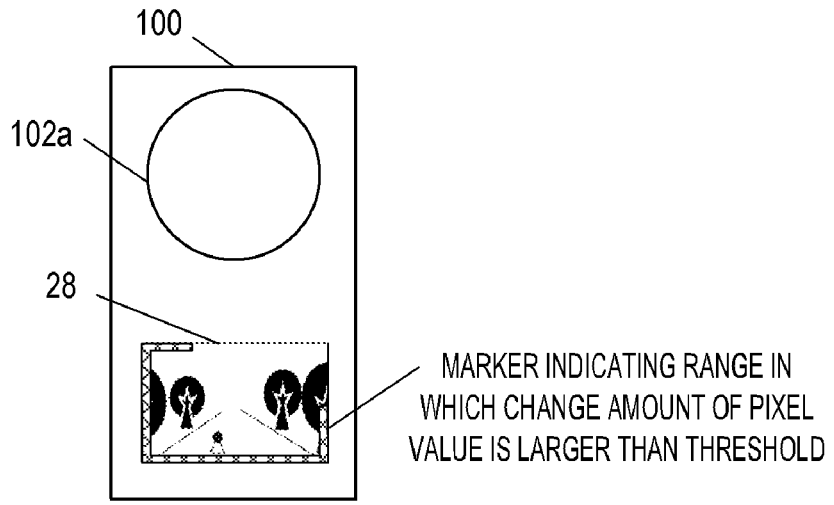

The system control unit 50 performs the predetermined notification for the user by overlaying and displaying on the display range an item indicating a portion (change portion) at which a change amount of a pixel value in a joint area is larger than the threshold. FIG. 9B is a view illustrating an angle θ at which a change amount of a pixel value is determined to be larger than the threshold. In FIG. 9B, it is determined that change amounts of pixel values in the joint area are larger than the threshold in a range of angle θ=θs to θe. FIG. 9C illustrates an example where an item (marker) highlighting a portion corresponding to a direction of angle θ=θs to θe (a direction in which there is a change portion) on the outer circumference of the display range is displayed. The item in FIG. 9C is displayed when the change portion is outside the display range. According to display in FIG. 9C, the user can easily grasp at the time of photographing whether or not a joint is visible. Furthermore, when there is a change portion, the user can also easily determine whether or not to continue photographing.

Figure 10A:
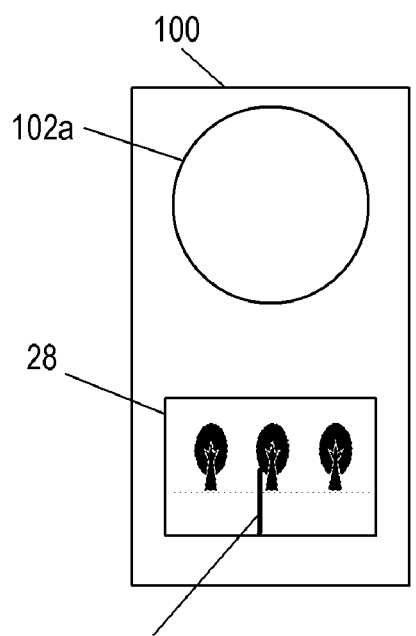
FIGS. 10A and 10B are schematic views of an item that indicates the position of the change portion.
Figure 10B:
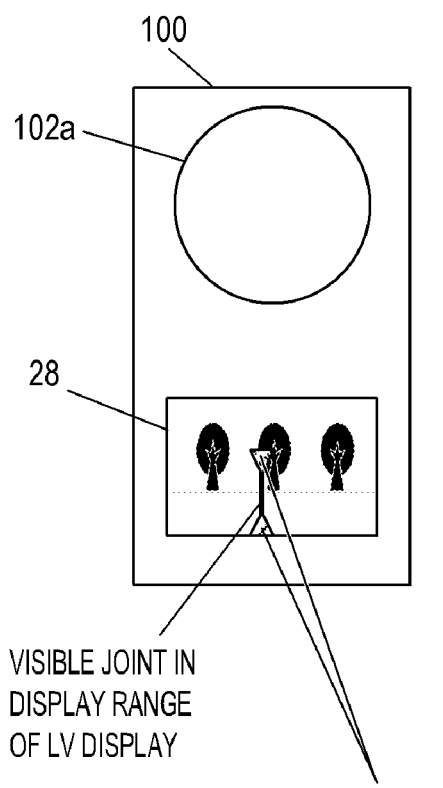

In a case where the display range can be changed as in a case of VR display, a change portion may be included in the display range (the change portion is located inside the display range). In such a case, an item that highlights the entire change portion may be displayed, and an item may not be displayed as in FIG. 10A. The user may switch at random whether to display or hide the item. Furthermore, as illustrated in FIG. 10B, an item that highlights the both ends of a change portion may be displayed.

Figure 11:
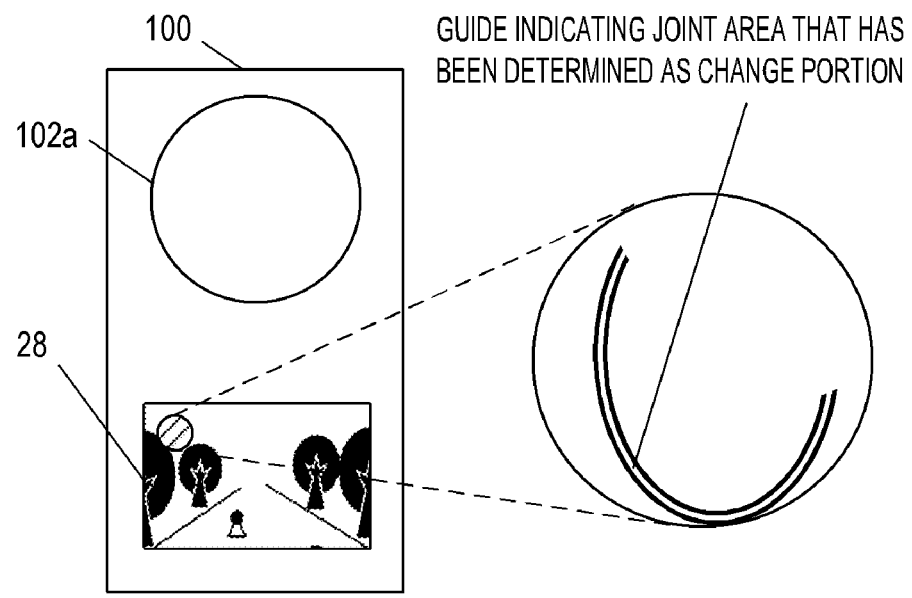
FIG. 11 is a schematic view of an item that indicates the position of the change portion.

As illustrated in FIG. 11, a spherical item corresponding to an imaging range of a 360-degree image may be displayed. This item indicates a positional relationship between a display range and a change portion. For example, a portion corresponding to the change portion in the item is highlighted, and a portion corresponding to the display range is also indicated by a predetermined method. Although the method for indicating the portion corresponding to the display range is not limited in particular, for example, the portion corresponding to the display range is displayed at the same position at all times. In this case, the item rotates in response to change of the display range. Note that the portion corresponding to the display range may be highlighted similar to the change portion. In this case, the item may be fixed, and the portion corresponding to the display range may move in response to change of the display range.

Modified Example

Figure 7B:
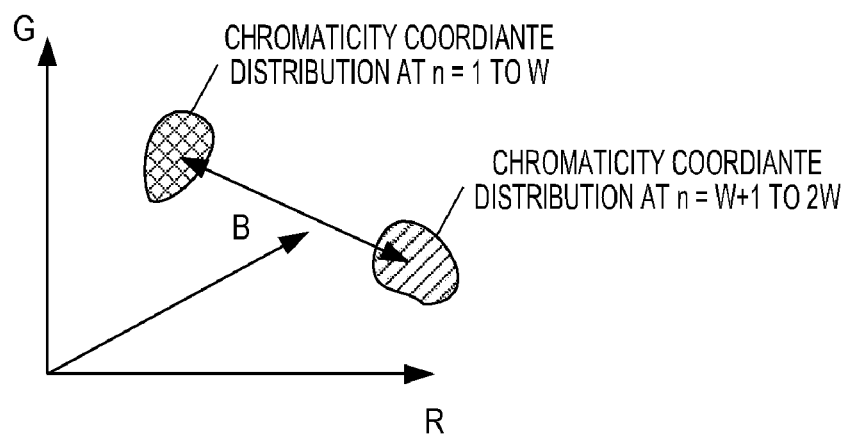

A case where color space coordinates are used as a pixel value will be described. In a case where the color space coordinates are used as the pixel value, a Euclidean distance in a color space may be used as a change amount of the pixel value. According to this method, it is possible to determine whether or not a joint is visible on the basis of a color difference between the joint area 403 and the joint area 404. FIG. 7B is a view illustrating an example of a method for acquiring a Euclidean distance in an RGB space as a change amount of a pixel value. According to the method in FIG. 7B, a color space coordinate group stored in index n=1 to W, and a color space coordinate group stored in index n=W+1 to 2 W is arranged in the RGB color space to calculate an average value of each color space coordinate group for a certain angle θ. Furthermore, the Euclidean distance between the acquired average values is calculated as the change amount of the pixel value. Note that, although an example where the RGB color space is used has been described, the color space to be used may be a YUV color space, a Lab color space, and the like.

Note that, although an example where one type of a change amount is used as a change amount of a pixel value has been described, a plurality of types of change amounts may be used. For example, in a case where at least one of the plurality of types of change amounts is larger than the threshold, the predetermined notification may be performed, and, in a case where at least one of the plurality of types of change amounts is not larger than the threshold, the predetermined notification may not be performed. In a case where all of the plurality of types of change amounts are larger than the threshold, the predetermined notification may be performed, and, in a case where all of the plurality of types of change amounts are not larger than the threshold, the predetermined notification may not be performed. In a case where the number of types of change amounts larger than the threshold is larger than a predetermined number, the predetermined notification may be performed, and, in a case where the number of types of change amounts is not larger than the predetermined number, the predetermined notification may not be performed.

As described above, according to Embodiment 1, by performing the predetermined notification when a change amount of a pixel value in a joint area is larger than the threshold, the user can easily grasp at a time of photographing whether or not a joint is visible.

Note that Embodiment 1 has described the example where the one imaging unit images a person, and the other imaging unit images a scenery, photographing scenes are not limited to this. When, for example, at dawn, the one imaging unit images dark sky on a western side in a night view mode, and the other imaging unit images bright sky on an eastern side at a white balance matching "cloudy", the processing according to Embodiment 1 can be suitably used. When imaging parameters of a plurality of imaging units are variously different, the processing according to Embodiment 1 can be suitably used.

Although the system control unit 50 starts the processing in FIG. 3 in response to generation of the first shutter switch signal SW1 in Embodiment 1, a timing to start the processing in FIG. 3 is not limited to this. In response to, for example, activation of the digital camera 100 in the photographing mode, or switch of the operation mode to the photographing mode, that is, switch to a photographing standby state, the processing in FIG. 3 may be started. The processing in FIG. 3 may be repeated in the photographing standby state.

Furthermore, although Embodiment 1 has described the example of the imaging apparatus including the two imaging units, the imaging apparatus may include three or more imaging units.

Embodiment 2

Embodiment 1 has described the example where the predetermined notification is performed irrespectively of the position of a change portion in the joint area. Embodiment 2 will describe an example where a disabled area is set, and, even when there is a change portion in the disabled area, the predetermined notification is not performed.

Figure 12:
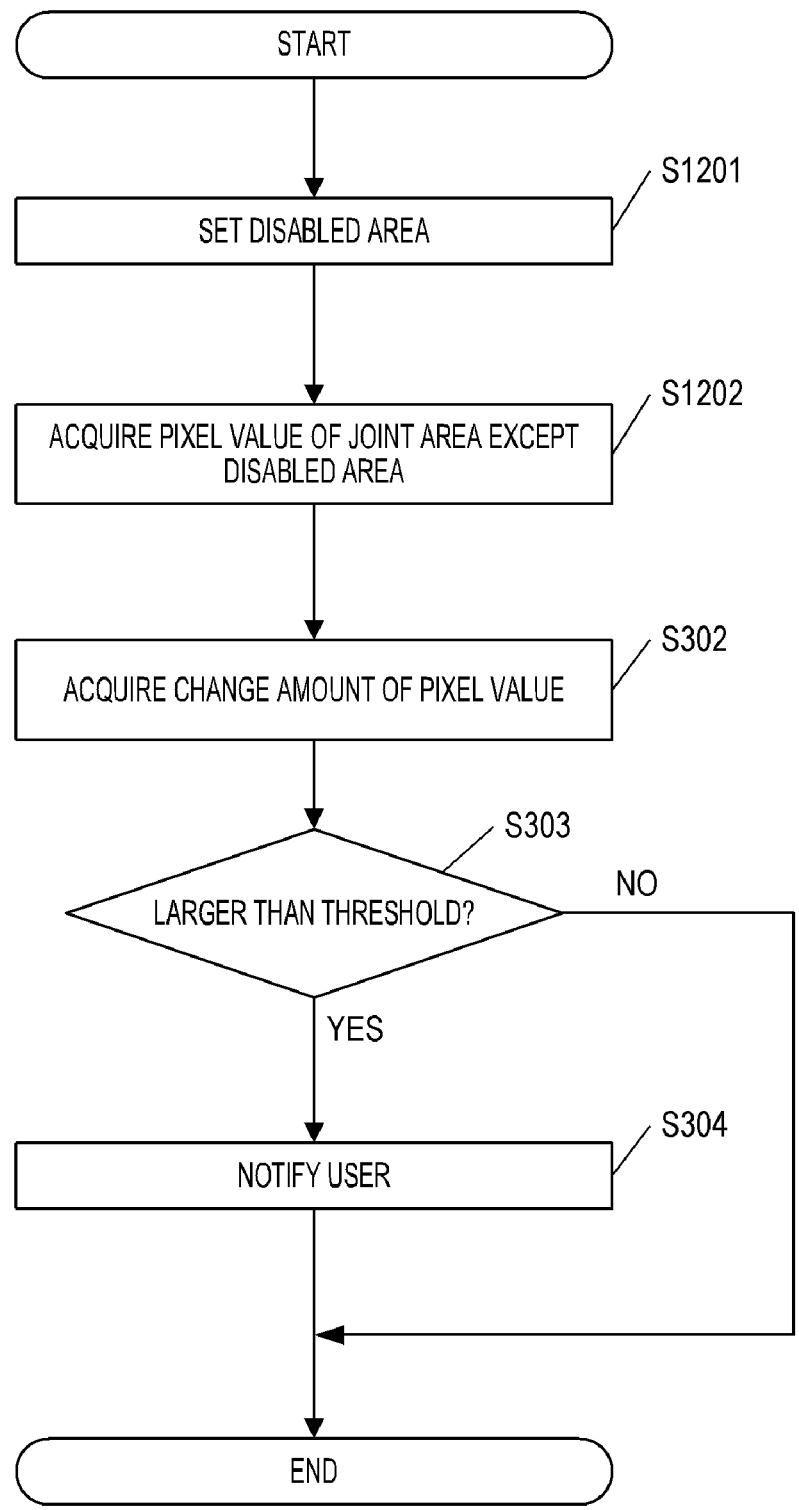
FIG. 12 is a flowchart illustrating processing of the digital camera according to Embodiment 2.

FIG. 12 is a flowchart illustrating a flow of processing of the digital camera 100 according to Embodiment 2.

Figure 13A:
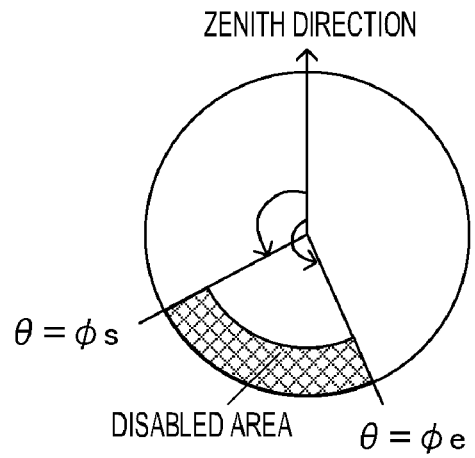
FIGS. 13A to 13C are schematic views illustrating a disabled area setting method.

In S1201, the system control unit 50 sets a disabled area (area setting). The disabled area may be stored in advance in the non-volatile memory 56, or may be designated by a user operation using the operation unit 70. FIG. 13A is a view for describing a disabled area designation method. By designating start angle θ=φs and end angle θ=φe of the disabled area, the disabled area is set.

Figure 13B:
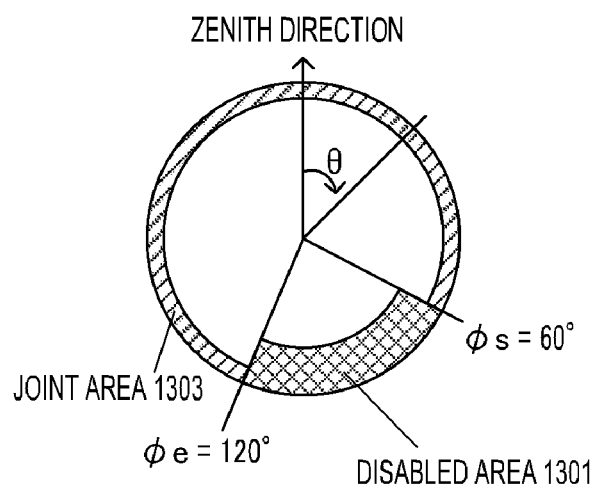
Figure 13C:
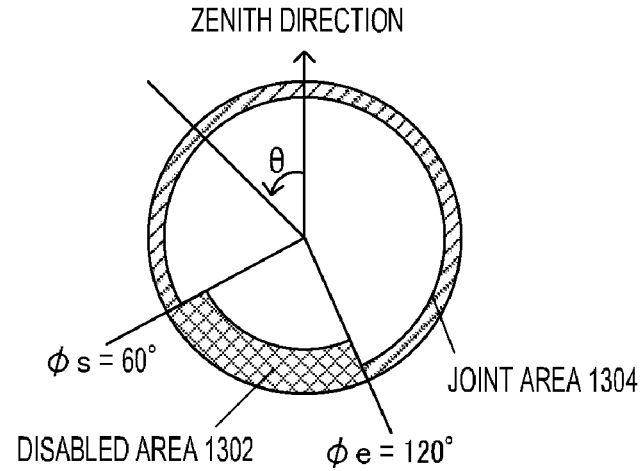

In S1202, the system control unit 50 acquires a pixel value of a joint area except the disabled area set in S1201. FIG. 13B illustrates a relationship between a joint area 1303 of a fish-eye image imaged by the imaging unit 22a, and a disabled area 1301. FIG. 13C illustrates a relationship between a joint area 1304 of a fish-eye image imaged by the imaging unit 22b, and a disabled area 1302. The joint area 1303 is an area formed by excluding the disabled area 1301 from the joint area 403 (entire circumference) illustrated in FIG. 4B. The joint area 1304 is an area formed by excluding the disabled area 1302 from the joint area 404 (entire circumference) illustrated in FIG. 4B. In a case of, for example, φs=60° and φe=120°, the joint areas 1303 and 1304 correspond to an angle range formed by excluding a range of angle θ=60° to 120° from the entire circumference (the range of angle θ=0° to) 360°.

The processing in S302 to S304 is as described in Embodiment 1.

A plurality of candidates (e.g., a range of +10° of a nadir or zenith portion) of the disabled area is stored in the non-volatile memory 56, and may be selected by the user. Furthermore, a plurality of disabled areas may be selected.

As described above, according to Embodiment 2, a disabled area is set, and, even when there is a change portion in the disabled area, the predetermined notification is not performed, so that it is possible to prevent unnecessary notification.

Note that, although the joint areas 1303 and 1304 from which pixel values are acquired are set by referring to the disabled areas 1301 and 1302 in S1202 in Embodiment 2, a timing to refer to the set disabled area is not limited to this. For example, in S1202, a pixel value may be acquired from an area of the entire circumference as a joint area similar to S301. In this case, in one of S302, S303, and S304, processing of the disabled areas 1301 and 1302 may be omitted by referring to the disabled areas 1301 and 1302. By so doing, when there is a change portion in the disabled area, it is possible to prevent the predetermined notification from being performed.

Embodiment 3

In Embodiment 1 and Embodiment 2, whether or not a joint is visible is determined by comparing a change amount of a pixel value with the threshold. Embodiment 3 will describe an example where a determination criterion is determined on the basis of a difference in imaging parameter between a plurality of imaging units.

Figure 14:
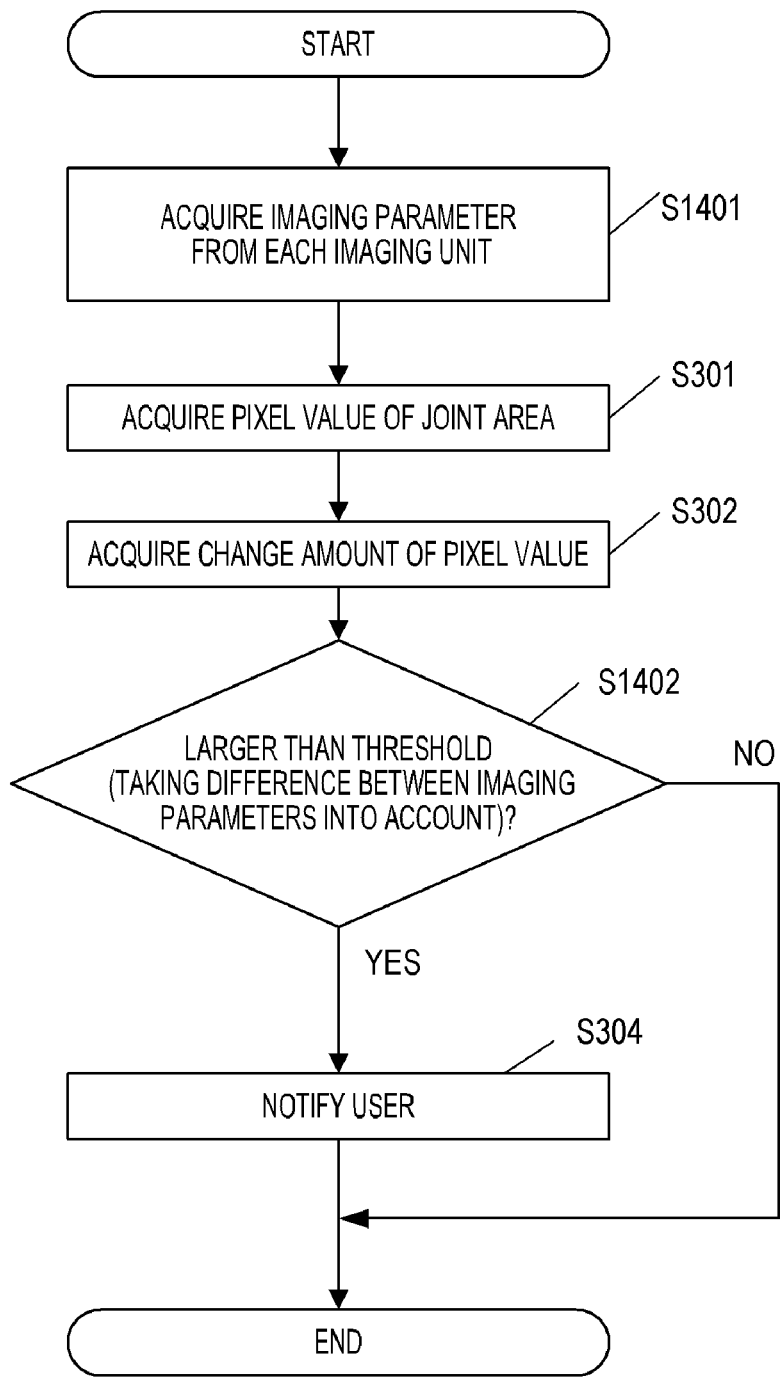
FIG. 14 is a flowchart illustrating processing of the digital camera according to Embodiment 3.

FIG. 14 is a flowchart illustrating a flow of processing of the digital camera 100 according to Embodiment 3.

In S1401, the system control unit 50 acquires an imaging parameter set to the imaging unit 22a, and an imaging parameter set to the imaging unit 22b. The imaging parameter is, for example, information indicating a white balance and a photographing mode (such as a night view and a portrait).

As described in Embodiment 1, in S301 the system control unit 50 acquires a pixel value of a joint area. In S302, the system control unit 50 acquires the change amount of the pixel value.

In S1402, the system control unit 50 determines whether or not the change amount of the pixel value acquired in S302 is larger than the threshold according to the determination criterion based on the difference between the two imaging parameters acquired in S1401. In a case where the change amount of the pixel value is larger than the threshold, the flow moves to S304, and, in a case where the change amount is not larger than the threshold, the processing in FIG. 14 is finished.

When the imaging parameter set to match with an object to image is set to each of the imaging units 22a and 22b, a probability that a joint becomes visible becomes extremely high depending on a combination of the imaging parameters. In such a case, there is a high probability that the user permits that the joint is visible, and wants to perform photographing using the imaging parameter set to match with the object. Hence, the system control unit 50 changes the determination criterion such that it is hardly determined that the change amount of the pixel value in the joint area is larger than the threshold. For example, the threshold to be compared with the change amount of the pixel value is increased, or the change amount of the pixel value is multiplied with a coefficient smaller than one.

As described above, according to Embodiment 3, it is possible to suitably perform notification by determining the determination criterion on the basis of the difference in imaging parameters between the plurality of imaging units. For example, it is possible to prevent unnecessary notification.

Note that the above-described various control that has been described as the processing performed by the system control unit 50 may be performed by one hardware, or a plurality of hardware (e.g., a plurality of processors or circuits) may share processing and control the entire apparatus.

Furthermore, although the embodiments of the present invention have been described in detail, the present invention is not limited to these specific embodiments, and the present invention covers various aspects without departing from the gist of the present invention. Furthermore, each of the above-described embodiments merely describes one embodiment of the present embodiment, and the respective embodiments can be also combined as appropriate.

Furthermore, the above-described embodiments have described as the examples the cases where the present invention is applied to the imaging apparatus (digital camera), yet are not limited to this example, and are applicable to electronic devices as long as the electronic devices can synthesize images. For example, the present invention is applicable to personal computers, PDAs, mobile telephone terminals, portable image viewers, printer apparatuses, digital photo frames, music players, game machines, electronic book readers, and the like. Furthermore, the present invention is applicable to video players, display apparatuses (including projection apparatuses), tablet terminals, smartphones, AI speakers, home appliance apparatuses, in-vehicle apparatuses, and the like.

Furthermore, the present invention is applicable not only to an imaging apparatus main body, but also to a control apparatus that communicates with an imaging apparatus (including a network camera) by wired or wirelessly and remotely controls the imaging apparatus. Examples of an apparatus that remotely controls the imaging apparatus include apparatuses such as smartphones, tablet PCs, and desktop PCs. By notifying the imaging apparatus of a command for causing the imaging apparatus to perform various operations and make settings from the control apparatus side on the basis of an operation performed on the control apparatus side or processing performed on the control apparatus side, it is possible to remotely control the imaging apparatus. Furthermore, the control apparatus side may receive a live view image photographed by the imaging apparatus by wired or via wireless communication, and display the live view image.

According to the present invention, the user can easily grasp at a time of photographing whether or not a joint between a plurality of images is visible in a combined image generated by connecting the plurality of images.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-067294, filed on Apr. 17, 2023, which is hereby incorporated by reference herein in its entirety.

What is claimed is:

1. An electronic device comprising:
    a processor; and
    a memory storing a program which, when executed by the processor, causes the electronic device to
    generate a combined image by connecting a plurality of images captured using each of a plurality of imaging optical systems;
    perform control to display a part of the combined image as a display range; and
    perform control to perform predetermined notification by overlaying an item on the display range to display, the item indicating a change portion at which a change amount of a pixel value of a joint area of the combined image between the plurality of images is larger than the threshold.

2. The electronic device according to claim 1, wherein, when the program is executed by the processor, the program further causes the electronic device to set an imaging parameter individually for each of the plurality of imaging optical systems.

3. The electronic device according to claim 1, wherein, when the program is executed by the processor, the program further causes the electronic device to
    acquire the change amount of the pixel value by using the plurality of images; and
    determine whether or not the change amount of the pixel value is larger than the threshold.

4. The electronic device according to claim 1, wherein the change amount of the pixel value includes at least one of a change amount of a brightness value, a change amount of a YUV color space coordinate, a change amount of an RGB color space coordinate, and a change amount of a Lab color space coordinate.

5. The electronic device according to claim 1, wherein the control is performed to perform the predetermined notification by at least one of light emission, sound, vibration, and display.

6. The electronic device according to claim 1, wherein, in a case where the change portion is outside the display range, the control is performed to perform the predetermined notification by displaying the item that highlights a portion corresponding to a direction, in which there is the change portion, at an outer circumference of the display range.

7. The electronic device according to claim 1, wherein, in a case where the change portion is inside the display range, the control is performed to perform the predetermined notification by displaying the item that highlights entirety of the change portion.

8. The electronic device according to claim 1, wherein, in a case where the change portion is inside the display range, the control is performed to perform the predetermined notification by displaying the item that highlights both ends of the change portion.

9. The electronic device according to claim 1, wherein the item is a spherical item corresponding to an imaging range of the combined image that is an omnidirectional image, and indicates a positional relationship between the change portion and the display range.

10. The electronic device according to claim 1, wherein, in a case where the change amount of the pixel value is larger than the threshold, the control is performed to perform the predetermined notification by displaying a guide that encourages to change an imaging parameter.

11. The electronic device according to claim 1, wherein the control is not performed to perform the predetermined notification even in a case where the change amount of the pixel value is larger than the threshold in a set disabled area among the joint area.

12. The electronic device according to claim 11, wherein, when the program is executed by the processor, the program further causes the electronic device to set the disabled area in response to a user operation.

13. The electronic device according to claim 1, wherein, when the program is executed by the processor, the program further causes the electronic device to determine a determination criterion on whether or not the change amount of the pixel value is larger than the threshold on a basis of a difference in an imaging parameter between the plurality of imaging optical systems.

14. A control method of an electronic device, comprising:
    generating a combined image by connecting a plurality of images captured using each of a plurality of imaging optical systems;
    performing control to display a part of the combined image as a display range; and
    performing control to perform predetermined notification by overlaying an item on the display range to display, the item indicating a change portion at which a change amount of a pixel value of a joint area of the combined image between the plurality of images is larger than the threshold.

15. A non-transitory computer readable medium that stores a program, wherein the program causes a computer to execute a control method of an electronic device, the control method comprising:
    generating a combined image by connecting a plurality of images captured using each of a plurality of imaging optical systems;
    performing control to display a part of the combined image as a display range; and
    performing control to perform predetermined notification by overlaying an item on the display range to display, the item indicating a change portion at which a change amount of a pixel value of a joint area of the combined image between the plurality of images is larger than the threshold.

* * * * *